United States Patent [19]

Yarnell

[11] Patent Number: 4,765,197
[45] Date of Patent: Aug. 23, 1988

[54] SPACER FOR TRANSMISSION SHAFT

[75] Inventor: James A. Yarnell, Temperance, Mich.

[73] Assignee: Dana Corporation, Toledo, Ohio

[21] Appl. No.: 826,169

[22] Filed: Feb. 6, 1986

Related U.S. Application Data

[63] Continuation-in-part of Ser. No. 627,149, Jul. 2, 1984, abandoned.

[51] Int. Cl.⁴ .................. F16H 57/04; F01M 9/10
[52] U.S. Cl. ................................ 74/467; 184/6.12
[58] Field of Search .............. 74/467, 409; 184/6.12, 184/13.1, 11.1

[56] References Cited

U.S. PATENT DOCUMENTS

| | | | |
|---|---|---|---|
| 1,532,557 | 4/1925 | Sturt . | |
| 1,553,767 | 9/1925 | Fulton . | |
| 1,749,247 | 3/1930 | Graham | 184/11.1 |
| 2,192,088 | 2/1940 | Lewis | 184/11.1 |
| 2,240,118 | 4/1941 | Matthews | 184/11.1 |
| 2,681,126 | 6/1954 | Searls | 184/6.12 |
| 2,935,889 | 5/1960 | Adams et al. . | |
| 3,083,790 | 4/1963 | McAfee et al. | 184/6.12 |
| 4,240,524 | 12/1980 | Katayama et al. | 74/467 |
| 4,319,499 | 3/1982 | Sanui et al. . | |
| 4,359,909 | 11/1982 | Sogo | 74/467 |
| 4,429,587 | 2/1984 | Finn, III. et al. | 74/467 |
| 4,559,023 | 12/1985 | Uchibaba et al. | 74/409 |

Primary Examiner—Randolph A. Reese
Assistant Examiner—Peter M. Cuomo

[57] ABSTRACT

An improved spacer for a transmission gear shaft facilitates axial locations of pairs of gears or bearings along the shaft. In a preferred form the spacer comprises an open coil member which defines a helicoidal body portion resiliently disposed between a pair of bearings. In addition to axially locating the bearings relative to one another, the helicoidal body portion facilitates the flow of splash and spray oil along the shaft between the bearings. In the same preferred form, the spacer is made of a non-heat treated high carbon spring steel.

4 Claims, 2 Drawing Sheets

4,765,197

SPACER FOR TRANSMISSION SHAFT

BACKGROUND OF THE INVENTION

This application is a continuation-in-part of co-pending Ser. No. 627,149 filed July 2, 1984 now abandoned.

The invention relates to spacer members positioned on transmission gear shafts for axially locating gears and bearings. The majority of standard or manually shifted transmissions are internally lubricated by "splash and spray" oil, whereby rotating members within the transmission housing extend into an oil sump at the bottom of the transmission housing and disperse oil over the internals of the transmission. Numerous efforts have been made to achieve satisfactory oil dispersions within the transmission housing; one of the more noteworthy being the use of troughs which receive oil thrown randomly for redirecting same to specific locations within the housing. One particular location of critical importance, for example, is the transmission pocket bearing. Another of such locations is the reverse idler shaft which is typically non-rotatable, but carries a reverse idler gear rotatable thereabout on needle bearings interposed between gear and shaft members. Typically, two such sets of needle bearings are utilized to support the rotation of the reverse idler gear. A spacer member is positioned between the sets of needle bearings to first axially locate the bearings, and then to insure proper rotational position of the bearings during operation. Typical spacers are generally tubular in design, and operate only to hold the bearings apart, providing no facilitation of lubrication of the bearings.

SUMMARY OF THE INVENTION

The transmission gear shaft spacer disclosed herein provides a system whereby a flow of splash and spray oil along the shaft between the bearings is facilitated. In a preferred form, the spacer has squared ends which engage a pair of bearings supporting a rotatable reverse idler gear on a non-rotatable shaft. The spacer defines a helicoidal body of an open coil configuration, the squared ends providing radially uniform support surfaces resiliently disposed between the bearings. In a preferred form the helicoidal body is of a non-heat treated high carbon steel.

A second embodiment of a transmission gear shaft spacer defines a helicoidal body of a closed coil configuration disposed tightly between a pair of gears radially fixed to a gear shaft. The spacer provides axial positioning of the gears with respect to one another. The ends of the spacer are also squared in the second preferred form.

DETAILED DESCRIPTION OF PREFERRED EMBODIMENTS

Figure 1:
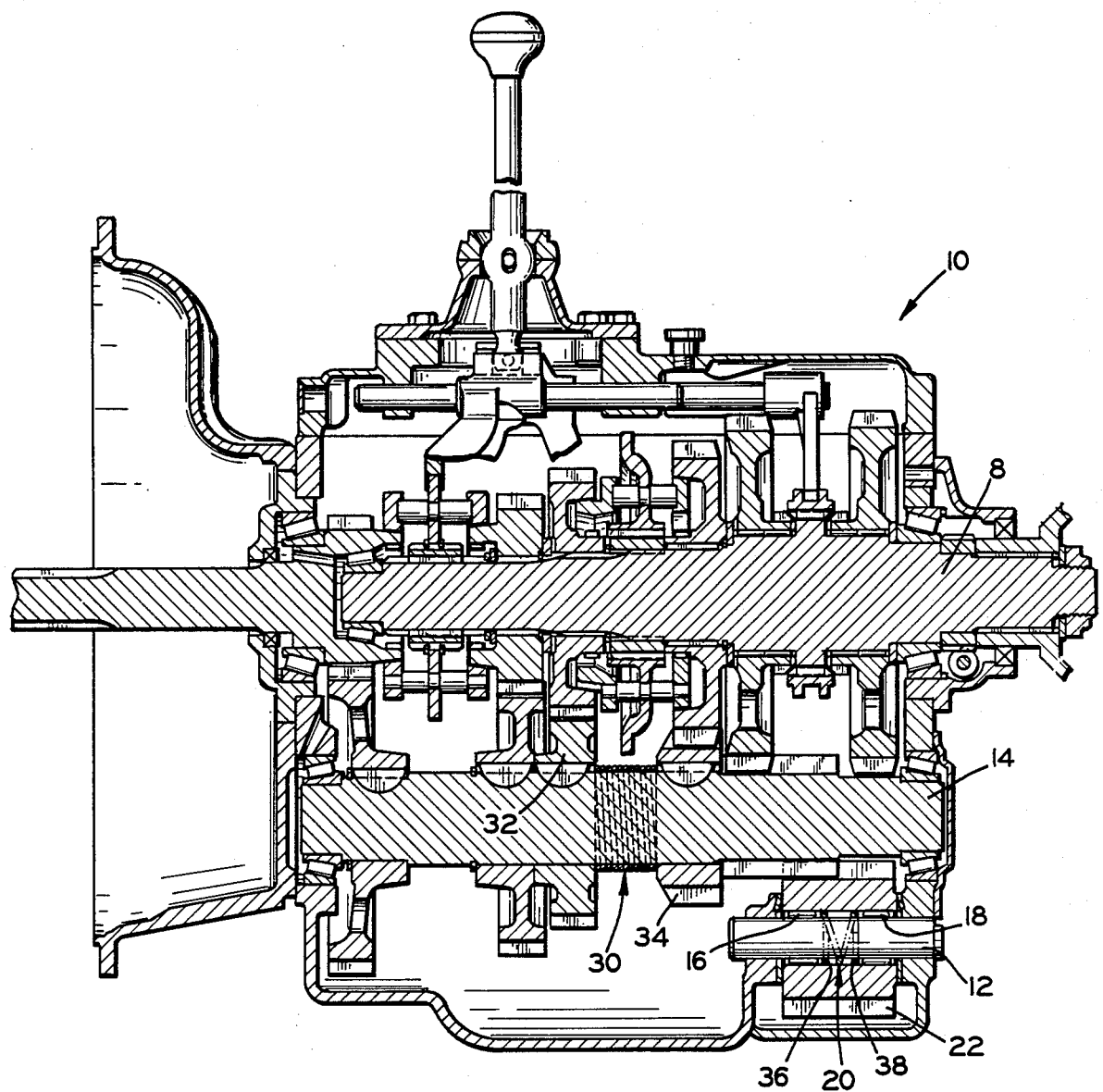
FIG. 1 is a cross sectional view of a transmission which employs two alternate preferred embodiments of the spacer of the present invention.

Referring initially to FIG. 1, a sectional view of a transmission 10 includes two separate alternate embodiments of spacers made in accordance with this invention at 20 and 30, respectively. The transmission 10 embodies a relatively standard configuration of manually shifted gears, the gears positioned on a mainshaft 8, a countershaft 14 and a non-rotatable reverse idler shaft 12. Each of the two spacers circumferentially encases a portion of a transmission gear shaft. The spacer 20 is of an open coil configuration, and circumferentially encases the reverse idler shaft 12, while the closed coil spacer 30 encases the countershaft 14.

The open coil spacer 20 is axially interposed on the reverse idler shaft 12 between a parallel set of bearings 16 and 18. In the preferred embodiment, the bearings are needle bearings, although the spacer of the invention described herein is suitable for use with other types or styles of bearings as well. The bearings 16 and 18 support a reverse idler gear 22, for rotation thereof about the reverse idler shaft 12 on the bearings 16 and 18.

Figure 2:
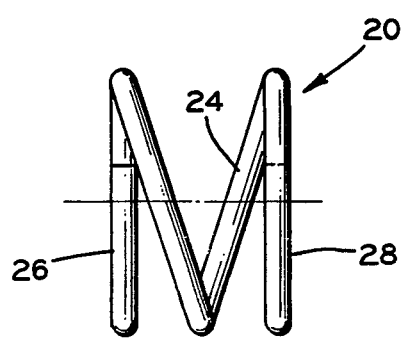
FIG. 2 is an isolated side view, partly in section and in a free standing mode, of one of the preferred embodiments shown in FIG. 1.

Referring now particularly to FIG. 2, the open coil spacer 20 defines a helicoidally shaped body portion 24, and has first and second squared ends 26 and 28, respectively. The squared ends 26 and 28 provide for radially uniform resilient support surfaces for contact with opposing inner ends 36 and 38 of respective bearings 16 and 18. In the preferred embodiment, the shaft will have an outside diameter slightly less than the inside diameter of the spacer. To the extent that the spacer is situated between the bearings 16 and 18, it will tend to rotate about the idler shaft 12 by virtue of friction drag forces imposed on the spacer ends 26 and 28 during rotation of the bearing inner ends 36 and 38 about the shaft 12. Thus the needle bearings 16 and 18 will frictionally cause the spacer 20 to rotate about the stationary reverse idler shaft 12. The resultant rotational movement of the helicoidal body portion 24 of the spacer 20 will produce an axial oil movement along the shaft 12 to facilitate lubrication of the needle bearings 16 and 18, which are not exposed directly to the splash and spray oil environment within the transmission 10.

It should be noted that the open coil spacer 20 may be disposed between the bearings 16 and 18 under a slight load; thus under a pre-loaded condition. It is suggested that the latter would insure continuous rotational movement of the spacer with the bearings about the non-rotating shaft 12. On the other hand, the spacer will move with the bearings without such pre-load, and even if there is slight axial floating of the spacer between the bearings by virtue of viscous drag forces imposed on the spacer due to surface tension of the oil.

Figure 3:
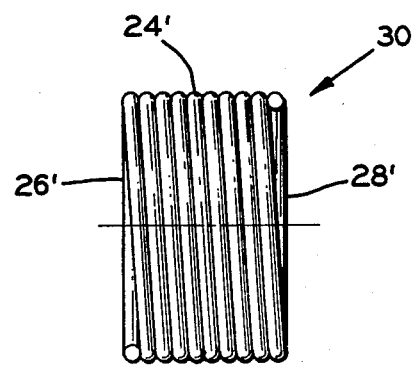
FIG. 3 is a side view, also in a free standing mode, of the other preferred embodiment shown in FIG. 1.

An alternate preferred embodiment of the spacer of the present invention defines a closed coil as shown at 30 in FIG. 3. The spacer 30, however, is positioned (see FIG. 1) between a pair of gears 32 and 34 located on the countershaft 14. The gears 32 and 34 are keyed radially to the shaft 14, and the spacer insures the axial position of the gears with respect to one another on the shaft. Similarly to the ends 26 and 28 of the spacer 20, the ends 26' and 28' of the spacer 30 are squared for establishing a radially uniform support surface for contact with each of the gears. In this case, however, the contact is not resilient as there is no need for preloading of the sides of the gears 32 and 34.

It will be appreciated by those skilled in the art that the countershaft 14 is a rotatable shaft, and as a result will rotate the spacer member 30. The member 30 is fully exposed to the splash and spray oil environment within the transmission body. Those skilled in the art will appreciate the fact that the helicoidal body portion 24' of the spacer 30 will tend to cause oil slung away from the spacer to have a slight axial, as opposed to fully radial, component. As a result, the closed coil spacer 30 may be employed to enhance the oil dispersion within the transmission body by distributing the oil in a more desirable spray pattern. Again, in a preferred form, the spacer 30 is made of non-heat treated high carbon spring steel.

Figure 4:
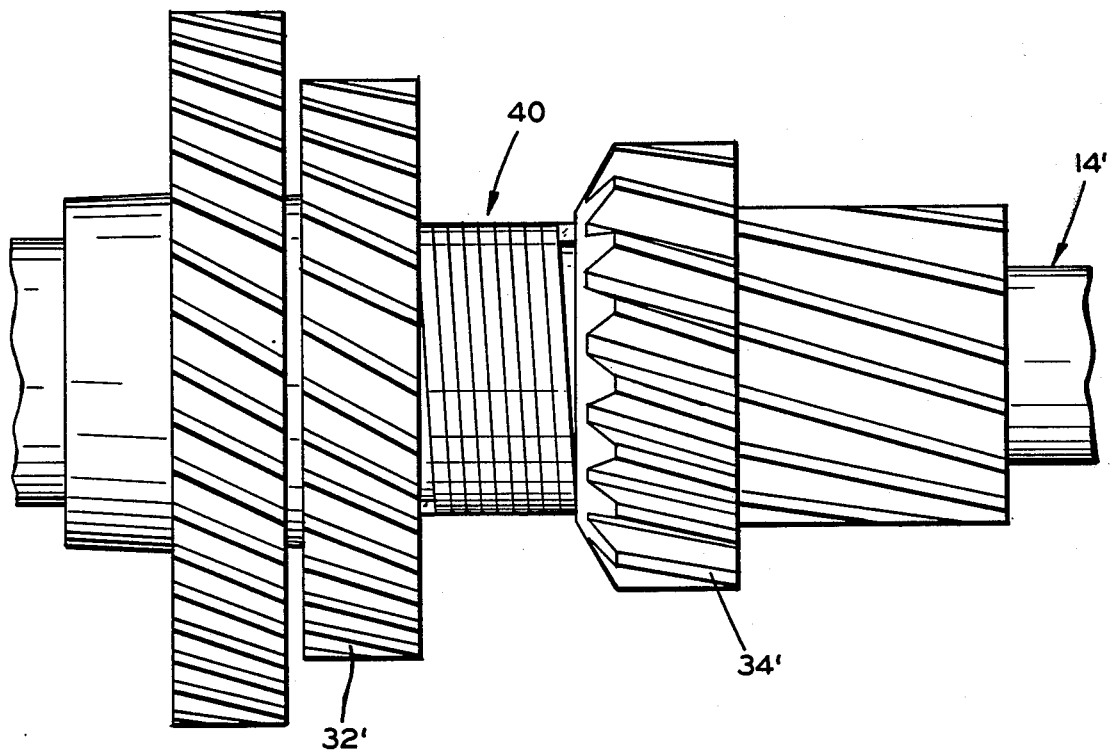
FIG. 4 is a perspective view of yet another embodiment of the spacer of the present invention for preferred use in a transmission which utilizes helical gears, as opposed to spur gears.
Figure 5:
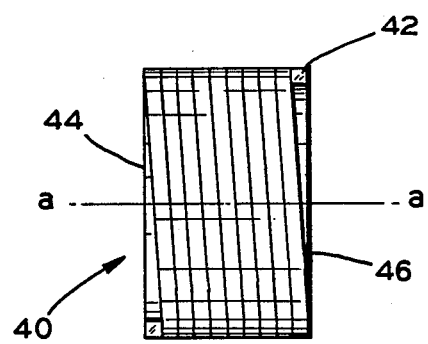
FIG. 5 is an isolated side view of the spacer of FIG. 4.

An alternate preferred form of the closed coil spacer 30 is a closed coil spacer 40 as shown in FIGS. 4 and 5. The spacer 40 has a square cross-section, and is desirable for use in transmission gear systems utilizing helical gears, as opposed to spur gears. Helical gears present end thrust loading problems due to the nature of the thrust loads imparted between the gears. Hence helical gears involve forces which have axial components resulting in axial thrust loads. The result is that the spacer members between such gears are subject to relatively high compressive axial loads, and under such conditions, the adjacent individual coils of the round cross-sectional spacer 30 of FIG. 3 tend to cam up over themselves and collapse when employed with helical gears of the type 32' and 34' as shown in FIG. 4. By contrast, the adjacent coils of the square cross-section spacer 40 of FIG. 5 will not "cam up" and will instead tend to transmit axial thrust forces uniformly between individual coils.

The problem is particularly exacerbated by the radial expansion to which the spacer element is subjected during normal rotation speeds of the counter-shaft. The counter-shaft will typically reach speeds of up to approximately 1800 revolutions per minute, and at times may momentarily reach even higher speeds.

FIG. 4 depicts the closed coil spacer 40 as being nested between helical gears 32' and 34'. The latter helical gears are counterparts of spur gears 32 and 34 of FIG. 1. In addition, the counter-shaft 14' of FIG. 4 is a counterpart of the counter-shaft 14 of FIG. 1.

FIG. 5 shows the square cross-section 42 of the closed coil spacer 40, as well as the nature of the squared ends 44 and 46 of the spacer 40. Ideally, the spacer ends 44 and 46 parallel each other, and each is perpendicular to the longitudinal axis a—a of the spacer.

Although only four preferred embodiments of the spacer of the present invention have been described and shown herein, there are many variations of the invention which are envisioned to fall within the scope of the following apended claims.

What is claimed is:

1. A spacer disposed for circumferentially encasing a non-rotatable transmission gear shaft, said spacer comprising a helicoidal body portion defining an open coil, said body portion having ends resiliently disposed between a pair of bearings rotatably supported on said shaft, said bearings supporting a gear rotatable about said non-rotatable shaft, said body portion being radially encased by said gear, said body portion causing a unidirectional axial flow of splash and spray oil along said shaft between said rotating bearings thereby defining an axial flow pumping means, said ends of said coil being squared and defining radially uniform resilient support surfaces for contact with opposing ends of said bearings, said shaft having an outside diameter slightly less than the inside diameter of the spacer, whereby as said bearings rotate about said non-rotatable shaft, said spacer rotates about said shaft with said bearings.

2. The spacer of claim 1 wherein said shaft is a non-rotatable reverse idler shaft, and wherein the shaft contains a rotatable gear supported on said non-rotatable shaft radially outwardly of said spacer, whereby said splash and spray oil is urged through said bearings disposed either side of said spacer by said helicoidal body portion of said spacer.

3. The spacer of claim 2 wherein said helicoidal body portion is a non-heat treated, high carbon spring steel.

4. The spacer of claim 3 wherein said squared ends are disposed for making resilient contact with needle bearings.

* * * * *